May 21, 1957 F. TROMBE 2,793,018
FURNACE FOR THE TREATMENT OF SUBSTANCES BY MEANS OF THE
ENERGY SUPPLIED BY A CONCENTRATED RADIATION
Filed July 24, 1953 3 Sheets-Sheet 1

INVENTOR
FELIX TROMBE,
BY
Robert B. Pearson
ATTORNEY

20
United States Patent Office 2,793,018
Patented May 21, 1957

2,793,018
FURNACE FOR THE TREATMENT OF SUBSTANCES BY MEANS OF THE ENERGY SUPPLIED BY A CONCENTRATED RADIATION

Felix Trombe, Paris, France, assignor to Centre National de la Recherche Scientifique, Paris, France, a society of France Application July 24, 1953, Serial No. 369,995

Claims priority, application France July 24, 1952

7 Claims. (Cl. 263—7)

It is known that the concentration of a radiation by means of a suitable optical device, for instance the concentration of solar energy by means of a parabolic mirror, makes it possible to obtain very high temperatures, owing to which the most refractory substances can be melted.

In what follows, I will refer to solar energy but the invention is applicable to all concentrated radiations, for instance to the radiations supplied by a high intensity electric arc or to cathode rays radiations.

If no special precautions are taken, the high energetic density of the radiation causes a part of the substance to be volatilized during melting. Furthermore, some substances reflect or transmit the radiation and retain only a small portion of the incident energy. The efficiency of the operation therefore depends upon the optical qualities of the matter that is being treated.

It has been suggested to make use of cavities formed in a mass of refractory substance and efficiently heat insulated, such a cavity having a narrow inlet into which the solar radiation converges. The energy then accumulates in the cavity and the temperature gradually rises therein. The rate of heating depends upon the internal area of the cavity, which area is generally much greater than the cross section area of the orifice through which the radiation enters said cavity. Such a device fully avoids the risks of local overheating and there is relatively little energy lost through the inlet orifice. Solar radiation enters the cavity with a concentratin which may reach several kilowatts per square centimeter, but the radiation of the cavity is a black body radiation which depends only upon the temperature and which is independent of the nature of the substances that are treated. For temperatures averaging 2000° C., for instance, the loss of energy by radiation is but a small portion of the incident energy.

Such a device therefore has many advantages such as: elimination of the thermal shock, losses by radiation independent of the optical properties of the substances that are treated, possibility of bringing simultaneously to a high temperature important amounts of matters, and so on.

However, a difficulty may occur which results from the possibility of reactions between the substance to be treated and the substance which constitutes the wall of the recess.

The object of the present invention is to eliminate this difficulty.

Other objects of my invention will also appear in the course of the following description.

The invention consists chiefly in forming the cavity in a structure turning about an axis passing through the orifice through which the radiation enters said cavity, the speed of rotation being sufficient to cause the matters contained in said cavity, preferably in the form of powders, to be projected and maintained against the inner walls of the cavity by centrifugal effect. The speed of revolution may vary from some hundreds to some thousands of revolutions per minute.

The present invention therefore consists in a new application of rotary furnaces and their adaptation to heating and treatment of substances by radiation and in particular by solar radiation. Such a rotary furnace has over internally heated rotary furnaces as are known at the present time the great advantage that it makes it possible to melt and to treat substances in an atmosphere which can be chosen at will.

As a matter of fact, in the conventional rotary furnaces, the particular heating requires, inside of the furnace, an atmosphere of a predetermined nature, whether heating of said furnace is obtained by a flame or by means of a heat radiator electrically brought to a high temperature. Furthermore, the atmosphere is generally soiled (heating by means of a flame or by means of a carbon electrode for instance). The furnace according to my invention avoids these drawbacks while making it possible to obtain higher temperatures than with any other known device.

For practical purposes, the substance to be treated will be in the form of a powder so as to be uniformly distributed over the wall of the rotary cavity. The temperature gradient being directed from the inside toward the outside, the device includes in fact three different zones. The first zone, constituted by the external envelope, is at a relatively low temperature. It may be cooled by a suitable fluid (air or water for instance), and is generally constituted by a metal (iron, aluminium, etc.). The second zone is constituted by a portion of the powdery substance applied by centrifugal effect in contact with said external envelope, so that it does not reach melting temperature and constitutes, properly speaking, the retort in which is melted the substance subjected to the action of the radiation and which constitutes the third zone of the device. It is again pointed out that a very great advantage of the invention lies in the fact that the second and the third zones may be constituted by the same chemical substance. I thus avoid any impurities other than those contained in the matter to be treated, which is of very great advantage in some cases.

The furnace may be made of several portions assembled together for using said furnace and the fact that said furnace can be taken into pieces makes it very easy to extract the products that are formed.

This furnace combines the advantages of black body heating with those of rotary furnaces, without having the usual drawbacks of these two methods of heating.

There are many possible applications of the invention: melting of refractory mixtures, gradual transformations at high temperature without volatilizing, treatment of ores, continuous manufacture of pieces of revolution the shape and thickness of which depend upon different factors (rate of rotation, density of loading, energetic density, and so on).

It is even possible, by a continuous extraction of the substances at the rear of the furnace, to make tubes of variable thicknesses of refractory substances, such as mullite, alumina, silica, etc. It is also easy to produce on the substances that are treated gaseous reactions, such as the direct combination of oxygen and nitrogen, or to produce them in a suitable atmosphere. Finally, owing to the action of the centrifugal force, it is possible to separate different phases at high temperatures for instance a liquid and a solid, a liquid and another liquid, or a liquid and a gas.

In particular, it is pointed out that alumina, which is a body which absorbs but very little solar radiation, melts three times quicker in the furnace according to the invention than in the atmosphere, under identical conditions.

A preferred embodiment of my invention will be hereinafter described with reference to the accompanying drawings, given merely by way of example, and in which.

Figure 1:
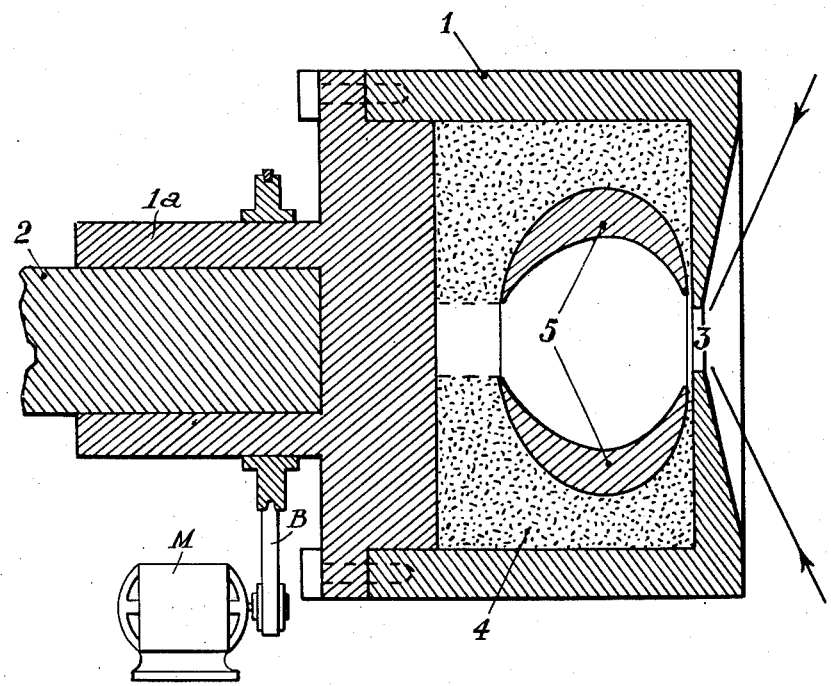
Fig. 1 is a diagrammatic sectional view of a rotary furnace used for melting refractory substances.

In these figures, the device for concentrating the radiation is not shown. It may be constituted by any dioptric or catadioptric device known in itself. Also the power device for rotating the furnace is not shown.

The furnace includes a cylindrical structure 1 rigid with a shaft 1a rotating about a support 2. Shaft 1a is driven through a belt B by a motor M. The radiation enters through orifice 3 in which must be located the zone of concentration of said radiation, that is to say for instance the image of the sun supplied by a paraboloid. Reference numeral 4 designates the refractory powdery substance which is maintained against the wall of the cylinder by the centrifugal force. The molten substance occupies the central zone 5, the shape of which varies as above indicated in accordance with many different factors.

As cylinder 1 can be made of a metal, it is possible to make apparatus which can easily be taken to pieces, are fluidtight and are not brittle as the usual retorts, these apparatus resisting to shocks, being of relatively light weight and being undeformable under the effect of the centrifugal force. Shaft 2 may be hollow so as to make it possible to feed either continuously or discontinuously the matter or matters to be treated therethrough, or to extract the products therethrough.

Figure 2:
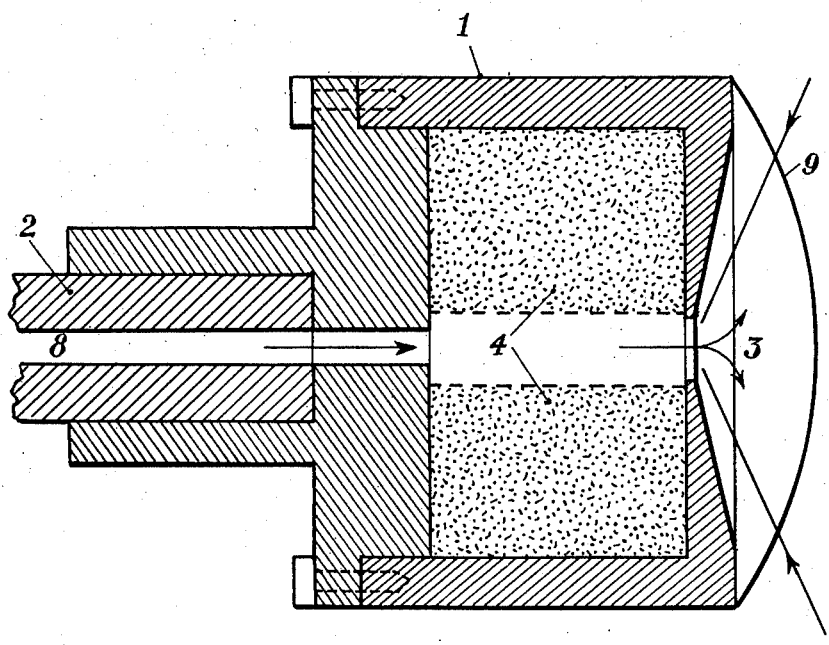
Fig. 2 is an analogous view but is concerned with a furnace in which the atmosphere of the treatment zone is suitably chosen.

Fig. 2 is a cross section of a rotary furnace in which is provided a predetermined atmosphere by the inflow of a gas at 8 in the direction of the axis of rotation. The gases may be either preheated or cooled at the outlet of the apparatus, with or without heat recovery. They may be recycled if necessary. In order to have a fluidtight treatment chamber, I provide a cover 9 of silica or tempered glass, which is transparent to solar radiation and which may include a tube, not shown in the drawing, for the circulation of gases.

Figure 3:
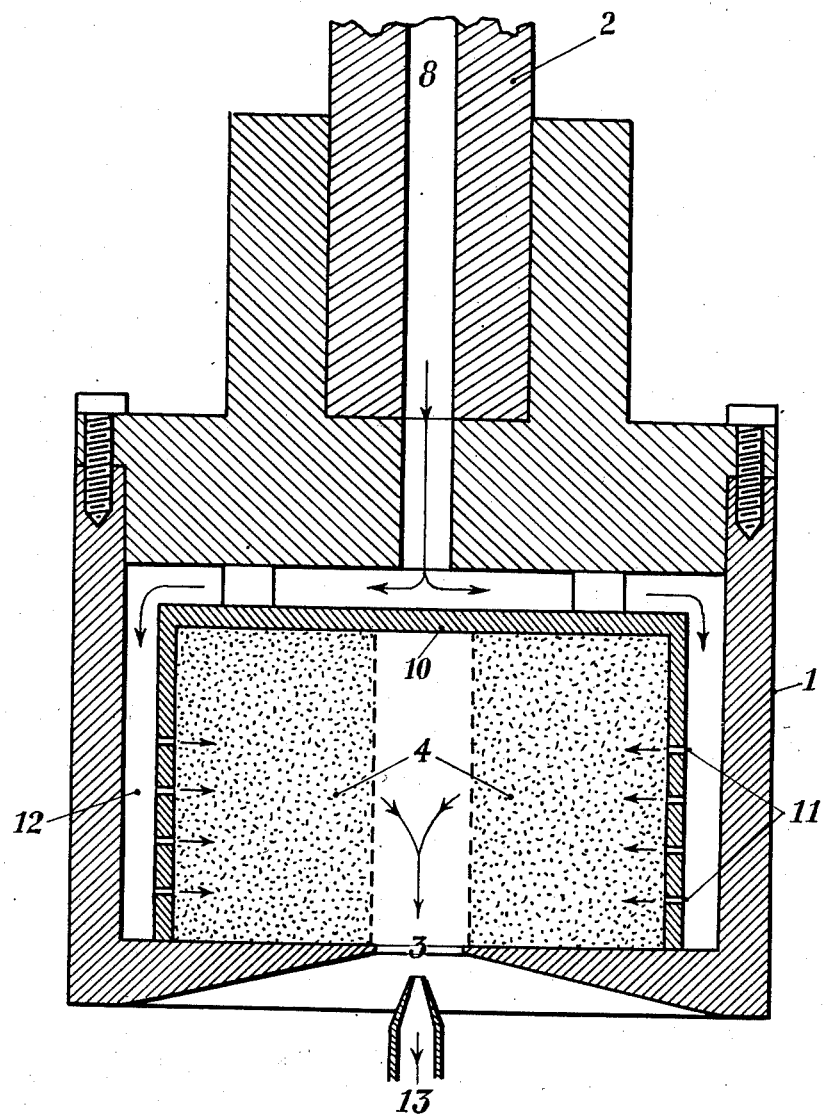
Fig. 3 is a diagrammatical view relative to a furnace adapted for producing gaseous phase reactions.

With the device illustrated by Fig. 3, the inflow of gas takes place into the matter itself to be treated. Such an apparatus makes it possible, in particular, to obtain at very high temperatures, reactions in a gaseous phase. For instance, it is possible to obtain direct synthesis of nitrogen oxide by passing air through a very refractory powder and drawing the gas at the orifice of the furnace. It is also possible to pass the gases across an inverse path.

In order to obtain reactions in a gaseous phase, I may also make use of a catalyst. This catalyst may be mixed with the solid substance inside the furnace or it may be fixed on this substance, by adsorption for instance.

The furnace includes, in addition to the elements illustrated by Figs. 1 and 2, a metallic or refractory cylinder 10 provided with orifices 11, the whole being rigid with cylinder 1 and separated therefrom by an annular interval 12.

The gases to be treated, coming from a compressor, not shown by the drawing, are fed through hollow shaft 8, flow through annular space 12 where they are heated, pass through the porous material 4 and are sucked out at 13 by means of a suitable device. The direction of circulation may be reversed.

Merely by way of indication, the porous material may consist of magnesia, glucina, zircone, alkali-earth oxides, thorine, etc., which may contain catalyst elements or compounds.

According to a modification, and in particular when the speed of rotation must be low, for instance from some tens of revolution to some hundreds per minute, the hollow shaft may be dispensed with and the device is mounted on rollers which drive the furnace in rotation.

With such a device, it is possible to obtain in particular bodies in the form of surfaces of revolution in a continuous fashion, the continuous feed of the matter being achieved at one end of the furnace and the piece being removed at the opposite end.

It should also be noted that the furnace according to my invention may be used for a continuous treatment but also for a discontinuous treatment and that the substances to be treated may be solid, liquid or gaseous.

In a general manner, while I have, in the above description, disclosed what I deem to be practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:

1. A furnace for the treatment of substances by means of the energy supplied by a concentrated radiation, this furnace comprising, in combination, a structure provided with a cavity in which the substance to be treated is placed, said cavity having a narrow orifice located at the place where the concentration of the radiation is at least approximately maximum, means for rotating said structure about a geometrical axis passing through said orifice, and a refractory powdery material distributed along the inner wall of said cavity, the speed of rotation of said structure being sufficient to apply and maintain said material against the inner wall of said cavity by centrifugal effect, whereby said powdery material constitutes an inner coating which protects said wall.

2. A furnace for the treatment of substances by means of the energy supplied by a concentrated radiation, this furnace comprising, in combination, a structure forming a cavity to receive the substance to be treated, said cavity having a narrow orifice located at the place where the concentration of said radiation is at least approximately maximum, a refractory powdery material distributed along the inner wall of said cavity, a support for said structure, a shaft rigid with said structure rotatable on said support, the axis of said shaft passing through said orifice, and means for rotating said shaft at a speed such that said material is applied and maintained against the inner wall of said cavity by centrifugal effect, whereby said powdery material constitutes an inner coating which protects said wall.

3. A furnace for the treatment of substances by means of the energy supplied by a concentrated radiation, this furnace comprising, in combination, a structure forming a cavity to receive the substance to be treated, said cavity having a narrow orifice located at the place where the concentration of said radiation is at least approximately maximum, a refractory powdery material distributed along the inner wall of said cavity, a support for said structure, a hollow shaft communicating with said cavity, rigid with said structure and rotatable on said support, the axis of said shaft passing through said orifice, and means for rotating said shaft at a speed such that said material is applied and maintained against the inner wall of said cavity by centrifugal effect, whereby said powdery material constitutes an inner coating which protects said wall.

4. A furnace for the treatment of substances by means of the energy supplied by a concentrated radiation, this furnace comprising, in combination, a structure forming a cavity to receive the substance to be treated, said cavity having a narrow orifice located at the place where the concentration of said radiation is at least approximately maximum, a refractory powdery material distributed along the inner wall of said cavity, a support for said structure, a hollow shaft communicating with said cavity, rigid with said structure and rotatable on said support, the axis of said shaft passing through said orifice, means for rotating said shaft at a speed such that said material is applied and maintained against the inner wall of said cavity by centrifugal effect, whereby said powdery material constitutes an inner coating which protects said wall, and a fixed conduit opening opposite said orifice to cooperate with the conduit constituted by said hollow shaft.

5. A furnace for the treatment of substances by means of the energy supplied by a concentrated radiation, this furnace comprising, in combination, a structure forming a cavity to receive the substance to be treated, said cavity having a narrow orifice located at the place where the concentration of said radiation is at least approximately maximum, a refractory powdery material distributed along the inner wall of said cavity, a support for said structure, a shaft rigid with said structure rotatable on said support, the axis of said shaft passing through said orifice, means for rotating said shaft at a speed such that said material is applied and maintained against the inner wall of said cavity by centrifugal effect, whereby said powdery material constitutes an inner coating which protects said wall, and a silica cover disposed on said orifice.

6. A furnace for the treatment of substances by means of the energy supplied by a concentrated radiation, this furnace comprising, in combination, a structure forming a cavity to receive the substance to be treated, said cavity having a narrow orifice located at the place where the concentration of said radiation is at least approximately maximum, a refractory powdery material distributed along the inner wall of said cavity, a support for said structure, a shaft rigid with said structure rotatable on said support, the axis of said shaft passing through said orifice, means for rotating said shaft at a speed such that said material is applied and maintained against the inner wall of said cavity by centrifugal effect, whereby said powdery material constitutes an inner coating which protects said wall, and a tempered glass cover disposed above said orifice.

7. A furnace for the treatment of substances by means of the energy supplied by a concentrated radiation, this furnace comprising, in combination, a structure forming a cavity to receive the substance to be treated, said cavity having a narrow orifice located at the place where the concentration of said radiation is at least approximately maximum, the side wall of said cavity being provided with a multiplicity of orifices, another wall included in said structure surrounding said first mentioned wall to form an annular space around it, a refractory powdery material distributed along the inner wall of said cavity, a support for said structure, a hollow shaft communicating with said annular space, rigid with said structure and rotatable on said support, the axis of said shaft passing through said orifice, means for rotating said shaft at a speed such that said material is applied and maintained against the inner wall of said cavity by centrifugal effect, whereby said powdery material constitutes an inner coating which protects said wall, and means for circulating a gas through said hollow shaft.

References Cited in the file of this patent
UNITED STATES PATENTS

| 797,891 | Himalaya | Aug. 22, 1905 |
| 1,684,800 | Maximoff | Sept. 18, 1928 |
| 2,557,971 | Jacklin | June 26, 1951 |